(12) United States Patent
Huang

(10) Patent No.: US 11,494,645 B2
(45) Date of Patent: Nov. 8, 2022

(54) CONVOLUTIONAL NEURAL NETWORK PROCESSOR AND DATA PROCESSING METHOD THEREOF

(71) Applicant: Egis Technology Inc., Taipei (TW)

(72) Inventor: Chao-Tsung Huang, Hsinchu (TW)

(73) Assignee: Egis Technology Inc., Hsinchu (TW)

(*) Notice: Subject to any disclaimer, the term of this patent is extended or adjusted under 35 U.S.C. 154(b) by 504 days.

(21) Appl. No.: 16/701,172

(22) Filed: Dec. 3, 2019

(65) Prior Publication Data

US 2020/0184332 A1   Jun. 11, 2020

Related U.S. Application Data

(60) Provisional application No. 62/776,426, filed on Dec. 6, 2018.

(30) Foreign Application Priority Data

Oct. 9, 2019   (TW) .................................. 108136729

(51) Int. Cl.
*G06N 3/08* (2006.01)
*G06N 3/06* (2006.01)
(Continued)

(52) U.S. Cl.
CPC ........... *G06N 3/08* (2013.01); *G06F 9/30101* (2013.01); *G06F 9/30145* (2013.01); *G06F 9/3822* (2013.01); *G06N 3/06* (2013.01)

(58) Field of Classification Search
None
See application file for complete search history.

(56) References Cited

U.S. PATENT DOCUMENTS 10,489,680 B2 * 11/2019 Aliabadi ................. G06V 10/82
11,182,668 B2 * 11/2021 Martin ................. G06N 3/0481
(Continued)

FOREIGN PATENT DOCUMENTS

CN      107886166 A  *  4/2018  ........... G06F 1/3287
CN      108268939 A  *  7/2018  ............ G06F 17/16
(Continued)

OTHER PUBLICATIONS

'A Programmable Parallel Accelerator for Learning and Classification' by Srihari Cadambi et al., PACT '10, Sep. 2010. (Year: 2010).*
(Continued)

*Primary Examiner* — Steven G Snyder
(74) *Attorney, Agent, or Firm* — JCIPRNET

(57) ABSTRACT

A convolutional neural network processor includes an information decode unit and a convolutional neural network inference unit. The information decode unit is configured to receive a program input and weight parameter inputs and includes a decoding module and a parallel processing module. The decoding module receives the program input and produces an operational command according to the program input. The parallel processing module is electrically connected to the decoding module, receives the weight parameter inputs and includes a plurality of parallel processing sub-modules for producing a plurality of weight parameter outputs. The convolutional neural network inference unit is electrically connected to the information decode unit and includes a computing module. The computing module is electrically connected to the parallel processing module and produces an output data according to an input data and the weight parameter outputs.

21 Claims, 11 Drawing Sheets

(51) Int. Cl.
*G06F 9/38* (2018.01)
*G06F 9/30* (2018.01)

(56) References Cited

U.S. PATENT DOCUMENTS

| | | | |
|---|---|---|---|
| 11,270,197 B2 * | 3/2022 | Shao | G06F 17/16 |
| 2018/0046900 A1 * | 2/2018 | Dally | G06F 9/30018 |
| 2018/0096226 A1 * | 4/2018 | Aliabadi | G06N 3/10 |
| 2018/0336164 A1 | 11/2018 | Phelps et al. | |
| 2018/0336165 A1 | 11/2018 | Phelps et al. | |
| 2019/0147324 A1 * | 5/2019 | Martin | G06F 7/5443 706/15 |
| 2019/0147325 A1 * | 5/2019 | Martin | G06F 7/5443 706/15 |
| 2019/0147326 A1 * | 5/2019 | Martin | G06F 17/15 706/15 |
| 2019/0147327 A1 * | 5/2019 | Martin | G06N 3/04 706/15 |
| 2019/0236135 A1 * | 8/2019 | Tyamagondlu Nagabhushan | G06N 3/08 |
| 2019/0244100 A1 * | 8/2019 | Seo | G06F 7/48 |
| 2019/0318229 A1 * | 10/2019 | Che | G06N 3/063 |
| 2020/0074202 A1 * | 3/2020 | Kim | G06K 9/6261 |
| 2020/0293867 A1 * | 9/2020 | Shao | G06F 17/16 |
| 2022/0067513 A1 * | 3/2022 | Stevens | G06N 3/08 |

FOREIGN PATENT DOCUMENTS

| | | | | |
|---|---|---|---|---|
| CN | 113326916 A | * | 8/2021 | G06F 17/153 |
| JP | 3210319 B2 | * | 9/2001 | G06N 3/063 |
| JP | 6257848 B1 | * | 1/2018 | G06K 9/42 |
| KR | 20200060302 A | * | 5/2020 | G06N 3/02 |
| KR | 20200139829 A | * | 12/2020 | G06F 15/17318 |
| TW | 201706871 | | 2/2017 | |
| TW | 201706872 | | 2/2017 | |
| WO | WO-2018214913 A1 | * | 11/2018 | G06F 1/3296 |

OTHER PUBLICATIONS

'On the Properties of Neural Machine Translation: Encoder—Decoder Approaches' by Kyunghyun Cho et al., Oct. 2014. (Year: 2014).*

'A Parallel Computing Platform for Training Large Scale Neural Networks' by Rong Gu et al., 2013 IEEE International Conference on Big Data. (Year: 2013).*

"Office Action of Taiwan Counterpart Application", dated Jun. 23, 2020, p. 1-p. 7.

* cited by examiner

Figure 1:
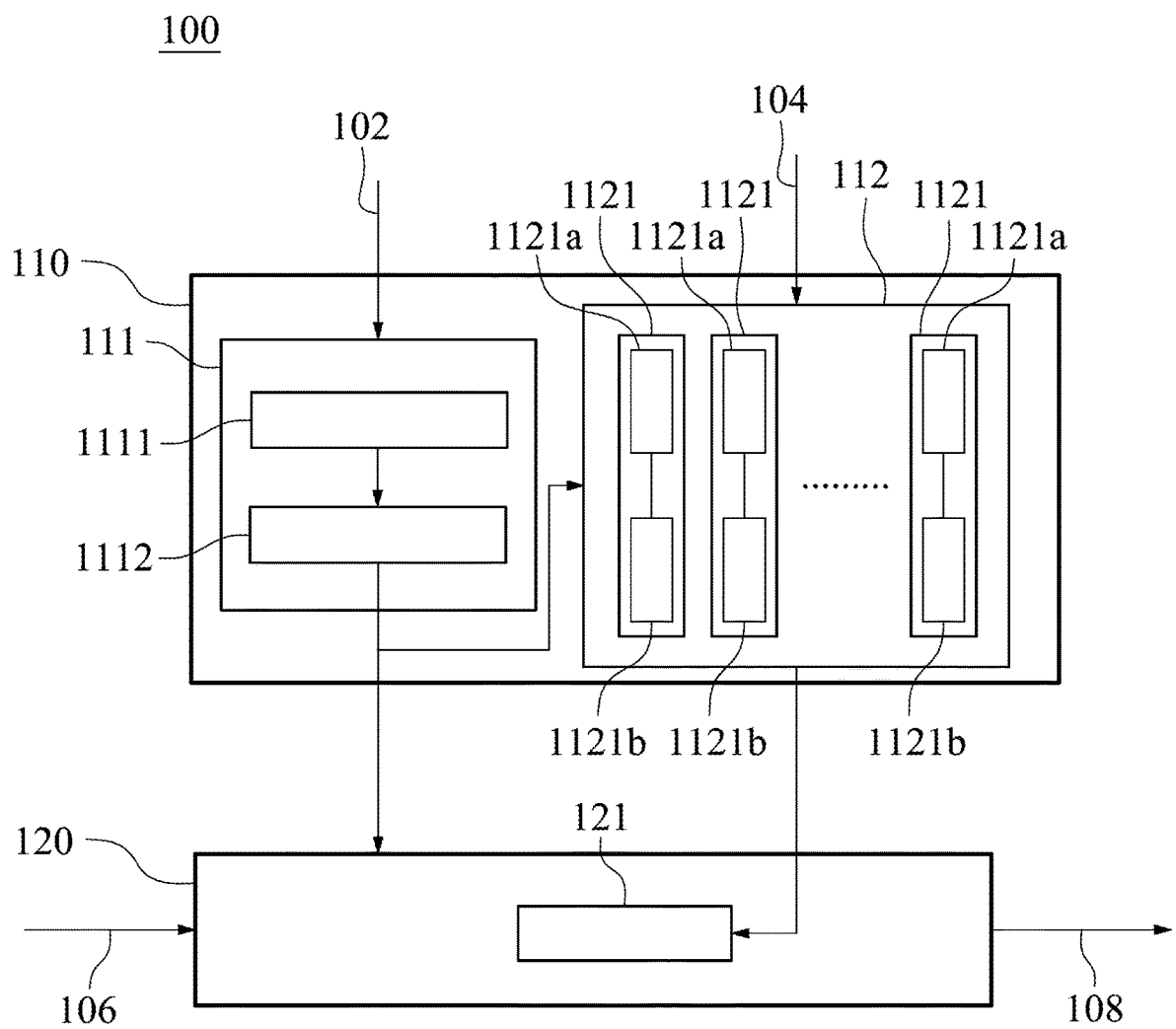

CONVOLUTIONAL NEURAL NETWORK PROCESSOR AND DATA PROCESSING METHOD THEREOF

RELATED APPLICATIONS

This application claims priority to U.S. Provisional Application Ser. No. 62/776,426 filed Dec. 6, 2018, and Taiwan Application Serial Number 108136729, filed Oct. 9, 2019, the disclosures of which are incorporated herein by reference in their entireties.

BACKGROUND

Technical Field

The present disclosure relates to a convolutional neural network processor and a data processing method thereof. More particularly, the present disclosure relates to a convolutional neural network processor, which includes an information decode unit and a convolutional neural network inference unit, and a data processing method thereof.

Description of Related Art

Convolutional neural networks (CNN) recently draw a lot of attention for their great success in computer vision and image processing fields. However, recent research in this direction mainly focuses only on object recognition/detection networks. Those hardware architectures of the convolutional neural networks are not optimized for image processing networks because two specific features are not considered for them: (1) spatial resolution is usually not downsampled and (2) model sparsity is ineffective. The former results in a dramatically-high amount of memory bandwidth, and the latter introduces an extremely-high demand of computing power.

Accordingly, it has become more important to develop a convolutional neural network processor, which is capable of performing a highly parallel computation, and a data processing method thereof for providing a computation with high performance.

SUMMARY

According to one aspect of the present disclosure, a convolutional neural network processor is configured to compute an input data. The convolutional neural network processor includes an information decode unit and a convolutional neural network inference unit. The information decode unit is configured to receive a program input and a plurality of weight parameter inputs and includes a decoding module and a parallel processing module. The decoding module receives the program input and produces an operational command according to the program input. The parallel processing module is electrically connected to the decoding module, receives the weight parameter inputs and includes a plurality of parallel processing sub-modules. The parallel processing sub-modules produce a plurality of weight parameter outputs according to the operational command and the weight parameter inputs. The convolutional neural network inference unit is electrically connected to the information decode unit and includes a computing module. The computing module is electrically connected to the parallel processing module and produces an output data according to the input data and the weight parameter outputs.

According to another aspect of the present disclosure, a data processing method of a convolutional neural network processor includes a receiving step, a command decoding step, a parallel processing step and a computing step. The receiving step is performed for driving an information decode unit to receive a program input and a plurality of weight parameter inputs, in which the information decode unit includes a decoding module and a parallel processing module. The command decoding step is performed for driving the decoding module to receive the program input and output an operational command according to the program input. The parallel processing step is performed for driving the parallel processing module to receive the weight parameter inputs and parallelly process the weight parameter inputs according to the operational command for producing a plurality of weight parameter outputs. The computing step is performed for driving a computing module to receive an input data and the weight parameter outputs and compute the input data and the weight parameter outputs according to the operational command for producing an output data.

BRIEF DESCRIPTION OF THE DRAWINGS

The present disclosure can be more fully understood by reading the following detailed description of the embodiment, with reference made to the accompanying drawings as follows:

FIG. 1 is a block diagram showing a convolutional neural network processor according to an embodiment of a structural aspect of the present disclosure.

FIG. 2 is a block diagram showing a convolutional neural network processor according to an embodiment of another structural aspect of the present disclosure.

FIG. 3 is a block diagram showing a 3×3 computing sub-module of the convolutional neural network processor of FIG. 2.

FIG. 4 is a schematic view showing a 3×3 local convolutional computing unit of the 3×3 computing sub-module in FIG. 3.

FIG. 5 is a block diagram showing a convolutional neural network processor according to an embodiment of further another structural aspect of the present disclosure.

FIG. 6 is a block diagram showing a 1×1 computing sub-module of the convolutional neural network processor of FIG. 5.

FIG. 7 is a schematic view showing a 1×1 local convolutional computing unit of the 1×1 computing sub-module in FIG. 6.

FIG. 8 is a flow chart showing a data processing method of a convolutional neural network processor according to an embodiment of a methodical aspect of the present disclosure.

FIG. 9 is a flow chart of a command decoding step shown in the data processing method of the convolutional neural network processor of FIG. 8.

FIG. 10 is a flow chart of a parallel processing step shown in the data processing method of the convolutional neural network processor of FIG. 8.

FIG. 11 is a flow chart of a computing step shown in the data processing method of the convolutional neural network processor of FIG. 8.

FIG. 12 is a flow chart of a computing step of the data processing method of the convolutional neural network processor according to another embodiment of the methodical aspect in FIG. 8.

DETAILED DESCRIPTION

FIG. 1 is a block diagram showing a convolutional neural network processor 100 according to an embodiment of a structural aspect of the present disclosure. In FIG. 1, the convolutional neural network processor 100 includes an information decode unit 110 and a convolutional neural network inference unit 120. The convolutional neural network inference unit 120 is electrically connected to the information decode unit 110.

The information decode unit 110 receives a program input 102 and a plurality of weight parameter inputs 104. The information decode unit 110 includes a decoding module 111 and a parallel processing module 112. The decoding module 111 receives the program input 102 and produces an operational command according to the program input 102. The parallel processing module 112 is electrically connected to the decoding module 111 and receives the weight parameter inputs 104 and the operational command. The parallel processing module 112 includes a plurality of parallel processing sub-modules 1121 and produces a plurality of weight parameter outputs according to the operational command and the weight parameter inputs 104. The convolutional neural network inference unit 120 includes a computing module 121. The computing module 121 is electrically connected to the parallel processing module 112 and produces an output data 108 according to an input data 106 and the weight parameter outputs. In detail, after receiving the program input 102 and the weight parameter inputs 104, the information decode unit 110 of the convolutional neural network processor 100 utilizes the operational command, which is produced by the decoding module 111, to process the weight parameter inputs 104. Each parallel processing sub-module 1121 of the parallel processing module 112 can be electrically connected, respectively, to the decoding module 111 for producing, separately, the weight parameter outputs according to the operational command. The computing module 121 can compute for producing the output data 108 according to the input data 106 and the weight parameter outputs, which are produced by the parallel processing module 112. The input data 106 can be external data or data stored in a block buffer bank. Besides, the convolutional neural network processor 100 utilizes the block buffer bank instead of an input buffer or an output buffer to save the bandwidth of an external storage. Accordingly, the convolutional neural network processor 100 can perform a highly parallel computation via the configuration of the information decode unit 110 and the convolutional neural network inference unit 120 for providing a computation with high performance.

The decoding module 111 can include a program memory 1111 and a command decoder 1112. The program memory 1111 is capable of storing the program input 102. The command decoder 1112 is electrically connected to the program memory 1111. The command decoder 1112 decodes the program input 102 to output the operational command. That is, after the decoding module 111 receives the program input 102, it stores the program input 102 in the program memory 1111 and decodes the program input 102 by the command decoder 1112 for producing the operational command. Then, each of the parallel processing sub-modules 1121 is driven by the operational command to process the weight parameter inputs 104 for producing the weight parameter outputs.

When the weight parameter inputs 104 have a non-compressed form, the parallel processing sub-modules 1121 include a plurality of parallel sub-memories 1121a and a plurality of parallel sub-processors 1121b. The parallel sub-memories 1121a are configured to parallelly store the weight parameter inputs having the non-compressed form. Each of the parallel sub-processors 1121b is electrically connected to the decoding module 111 and one of the parallel sub-memories 1121a. Thus, the parallel sub-processors 1121b parallelly receive the weight parameter inputs having the non-compressed form according to the operational command for producing the weight parameter outputs. In detail, each of the parallel processing sub-modules 1121 can include one of the parallel sub-memories 1121a and one of the parallel sub-processors 1121b. After the parallel processing module 112 receives the weight parameter inputs 104, the weight parameter inputs 104 will be, separately, parallelly stored in the parallel sub-memory 1121a of each of the parallel processing sub-modules 1121. Each of the parallel processing sub-modules 1121 is individually and electrically connected to the decoding module 111, and thus each of the parallel sub-processors 1121b can parallelly receive the weight parameter input having the non-compressed form from the parallel sub-memory 1121a according to the operational command for producing the weight parameter output. Accordingly, the parallel processing module 112 can parallelly process the weight parameter inputs 104 for producing the weight parameter outputs.

When the weight parameter inputs 104 have a compressed form, the parallel processing sub-modules 1121 include a plurality of parallel sub-memories 1121a and a plurality of parallel sub-processors 1121b. The parallel sub-memories 1121a are configured to parallelly store the weight parameter inputs having the compressed form. Each of the parallel sub-processors 1121b is electrically connected to the decoding module 111 and one of the parallel sub-memories 1121a. Thus, the parallel sub-processors 1121b parallelly receive and decompress the weight parameter inputs having the compressed form according to the operational command for producing the weight parameter outputs. In detail, each of the parallel processing sub-modules 1121 can include one of the parallel sub-memories 1121a and one of the parallel sub-processors 1121b. After the parallel processing module 112 receives the weight parameter inputs 104, the weight parameter inputs 104 will be, separately, parallelly stored in the parallel sub-memory 1121a of each of the parallel processing sub-modules 1121. Each of the parallel processing sub-modules 1121 is individually and electrically connected to the decoding module 111, and thus each of the parallel sub-processors 1121b can parallelly receive the weight parameter input having the compressed form from the parallel sub-memory 1121a according to the operational command and decompress the weight parameter input having the compressed form for producing the weight parameter output. Accordingly, the parallel processing module 112 can parallelly process the weight parameter inputs 104 for producing the weight parameter outputs.

Figure 2:
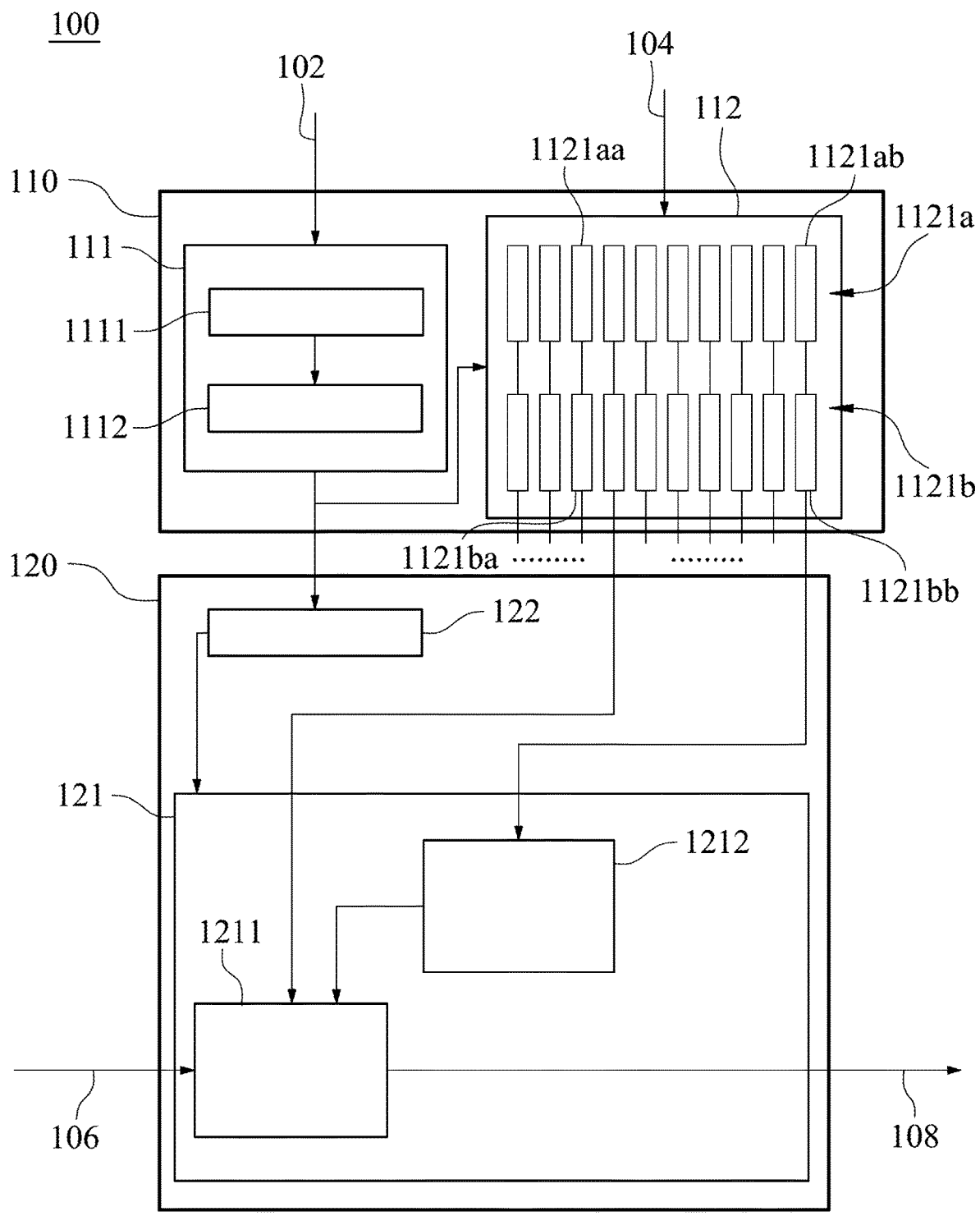
Figure 3:
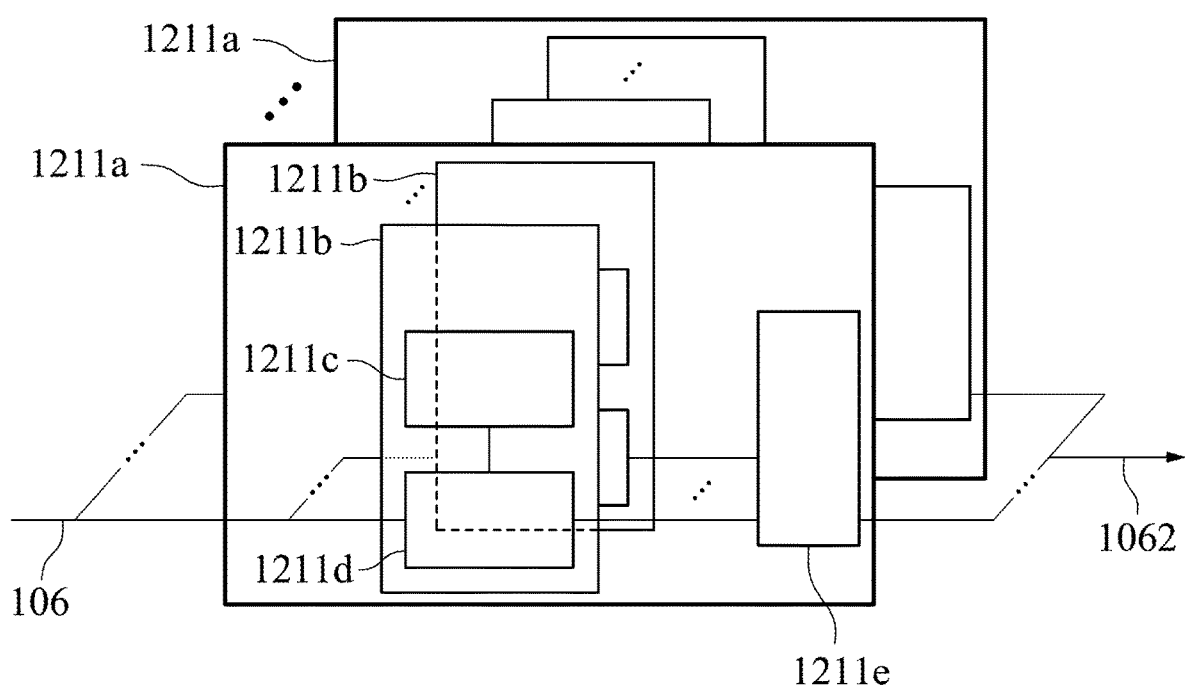
Figure 4:
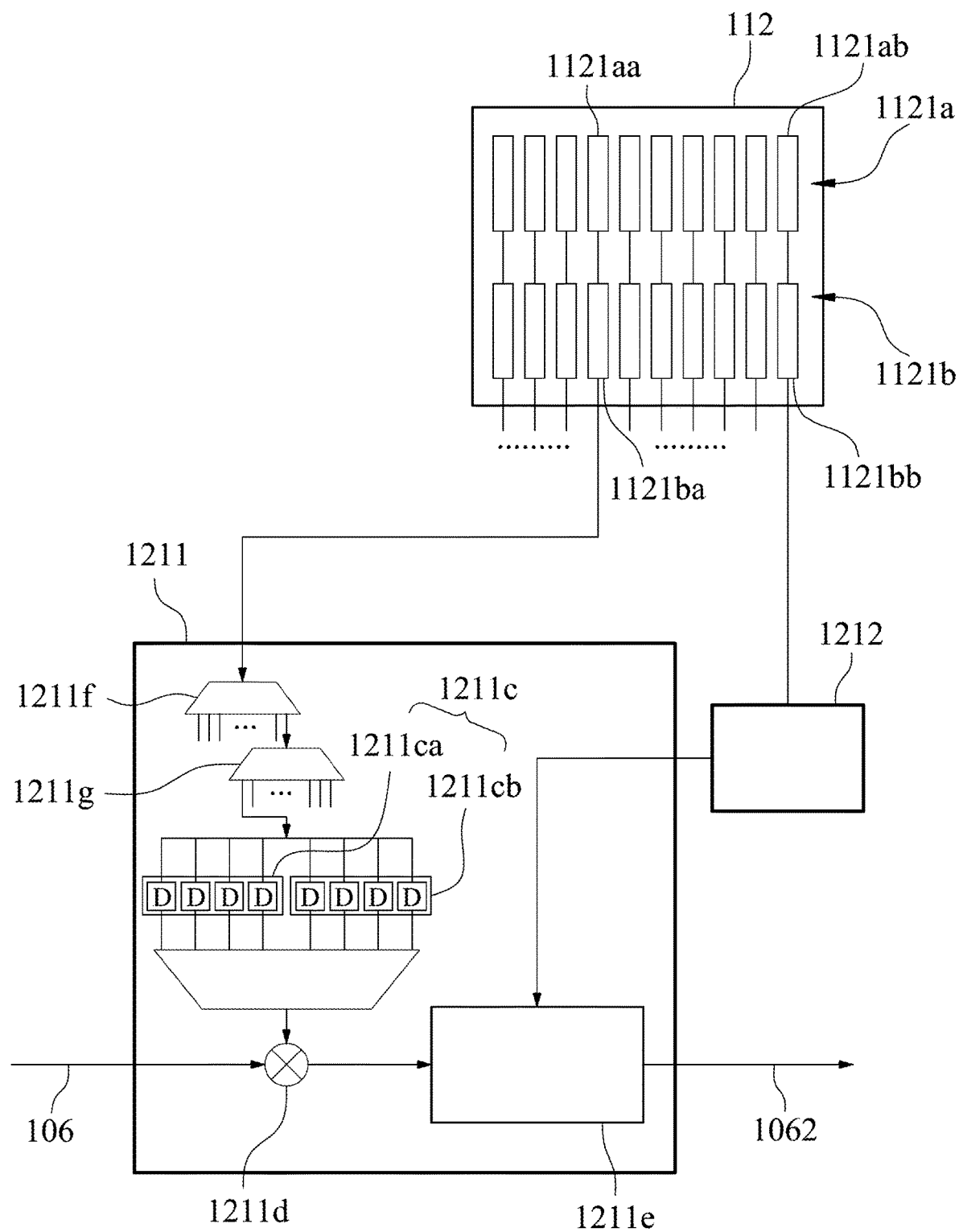

Please refer to FIG. 1, FIG. 2, FIG. 3 and FIG. 4. FIG. 2 is a block diagram showing a convolutional neural network processor 100 according to an embodiment of another structural aspect of the present disclosure. FIG. 3 is a block diagram showing a 3×3 computing sub-module 1211 of the convolutional neural network processor 100 of FIG. 2, and FIG. 4 is a schematic view showing a 3×3 local convolutional computing unit 1211b of the 3×3 computing sub-module 1211 in FIG. 3. In FIG. 2, FIG. 3 and FIG. 4, the weight parameter inputs 104 can include a plurality of first input weight parameters and a bias input parameter. The weight parameter outputs can include a plurality of first output weight parameters and a bias output parameter. The parallel processing sub-modules 1121 include a plurality of parallel sub-memories 1121a and a plurality of parallel sub-processors 1121b. The parallel sub-memories 1121a are configured to parallelly store the weight parameter inputs 104 and include a plurality of first parallel sub-memories 1121aa and a bias parallel sub-memory 1121ab. The first parallel sub-memories 1121aa are respectively configured to parallelly receive and store one of the first input weight parameters. The bias parallel sub-memory 1121ab is configured to parallelly store the bias input parameter. The parallel sub-processors 1121b are respectively configured to be electrically connected to the decoding module 111 and one of the parallel sub-memories 1121a, and include a plurality of first parallel sub-processors 1121ba and a bias parallel sub-processor 1121bb. The first parallel sub-processors 1121ba are respectively configured to be electrically connected to one of the first parallel sub-memories 1121aa to receive one of the first input weight parameters according to the operational command for outputting one of the first output weight parameters. The bias parallel sub-processor 1121bb is electrically connected to the bias parallel sub-memory 1121ab and receives the bias input parameter according to the operational command for outputting the bias output parameter. In FIG. 2, the quantity of the first parallel sub-memory 1121aa and that of the first parallel sub-processors 1121ba are both nine. However, the quantity of the first parallel sub-memory 1121aa and that of the first parallel sub-processors 1121ba can be a multiple of nine in some other embodiments. The quantity of the bias parallel sub-memory 1121ab and that of the bias parallel sub-processor 1121bb are both one, but the present disclosure is not limited thereto. In detail, after receiving the weight parameter inputs 104, the parallel processing module 112 stores the first input weight parameters of the weight parameter inputs 104 in the first parallel sub-memories 1121aa and stores the bias input parameter in the bias parallel sub-memory 1121ab. The first parallel sub-processors 1121ba read the first input weight parameters from the first parallel sub-memories 1121aa according to the operational command and processes for producing the first output weight parameters. The bias parallel sub-processor 1121bb reads the bias input parameter from the bias parallel sub-memory 1121ab according to the operational command and processes for producing the bias output parameter.

Each of the first output weight parameters includes a plurality of 3×3 weight parameters. The computing module 121 can include a 3×3 computing sub-module 1211 and a bias distributor 1212. The 3×3 computing sub-module 1211 is electrically connected to the first parallel sub-processors 1121ba and computes for producing a 3×3 post-processing computing data 1062 according to the first output weight parameters and the input data 106. The 3×3 computing sub-module 1211 includes a plurality of 3×3 convolutional distributor assemblies, a plurality of 3×3 local convolutional computing units 1211b and a plurality of 3×3 post-processing computing units 1211e. Each of the 3×3 convolutional distributor assemblies is electrically connected to one of the first parallel sub-processors 1121ba so that the 3×3 convolutional distributor assemblies are configured to receive and distribute the 3×3 weight parameters of the first output weight parameters. Each of the 3×3 local convolutional computing units 1211b is electrically connected to one of the 3×3 convolutional distributor assemblies and includes a 3×3 local register assembly 1211c and a 3×3 local filtering computing unit 1211d. The 3×3 local register assembly 1211c is electrically connected to one of the 3×3 convolutional distributor assemblies so that the 3×3 local register assemblies 1211c of the 3×3 local convolutional computing units 1211b receive and store the 3×3 weight parameters of the first output weight parameters for outputting a plurality of 3×3 computing parameters according to the 3×3 weight parameters of the first output weight parameters. The 3×3 local filtering computing unit 1211d is electrically connected to the 3×3 local register assembly 1211c so that the 3×3 local filtering computing units 1211d of the 3×3 local convolutional computing units 1211b compute for producing a plurality of 3×3 computing data according to the 3×3 computing parameters and the input data 106. In detail, the 3×3 local filtering computing units 1211d can perform a 3×3 convolutional computation. When the quantity of the first parallel sub-processors 1121ba is nine, spatial filter positions of the 3×3 local filtering computing units 1211d are, respectively, corresponding to each of the first parallel sub-processors 1121ba. When the quantity of the first parallel sub-processors 1121ba is eighteen, the spatial filter position of the 3×3 local filtering computing unit 1211d is, respectively, corresponding to two of the first parallel sub-processors 1121ba. The present disclosure is listed as above and so on without further description. The 3×3 post-processing computing units 1211e are electrically connected to the 3×3 local convolutional computing units 1211b and perform a 3×3 post-processing computation according to the 3×3 computing data for producing the 3×3 post-processing computing data 1062. The output data 108 of the convolutional neural network processor 100 can be the 3×3 post-processing computing data 1062. The bias distributor 1212 is electrically connected to the bias parallel sub-processor 1121bb and the 3×3 computing sub-module 1211. The bias distributor 1212 produces a plurality of 3×3 bias parameters according to the bias output parameter and outputs the 3×3 bias parameters to the 3×3 post-processing computing units 1211e.

In FIG. 3, the 3×3 computing sub-module 1211 includes a plurality of 3×3 computing circuits 1211a, in which the number of the 3×3 computing circuits 1211a can be 32. Each of the 3×3 computing circuits 1211a is composed of a plurality of 3×3 local convolutional computing units 1211b and a 3×3 post-processing computing unit 1211e, in which the number of the 3×3 local convolutional computing units 1211b can be 32. That is, the number of the 3×3 local convolutional computing units 1211b of the 3×3 computing sub-module 1211 is 1024. The number of the 3×3 post-processing computing units 1211e is 32.

Please refer to FIG. 3 and FIG. 4. After the 3×3 computing sub-module 1211 receives the 3×3 weight parameters of the first output weight parameters, the 3×3 weight parameters can be distributed to the 3×3 local convolutional computing units 1211b by the 3×3 convolutional distributor assemblies. In FIG. 4, the 3×3 convolutional distributor assemblies utilize a two-stage distribution method. The 3×3 convolutional distributor assemblies include a first 3×3 convolutional distributor 1211f and a plurality of second 3×3 convolutional distributors 1211g. The first 3×3 convolutional distributor 1211f is electrically connected to the first parallel sub-processors 1121ba for receiving and distributing the 3×3 weight parameters of the first output weight parameters to the second 3×3 convolutional distributors 1211g. After the second 3×3 convolutional distributors 1211g receive the 3×3 weight parameters, the 3×3 weight parameters will be distributed to the 3×3 local convolutional computing units 1211b. Although the two-stage distribution method is applied in the present disclosure, the present disclosure is not limited thereto. Each of the 3×3 local register assemblies 1211c includes two sub-3×3 local register assemblies 1211ca, 1211cb. The two sub-3×3 local register assemblies 1211ca, 1211cb can be configured with a multiplexer for alternately storing one of the 3×3 weight parameters or outputting the 3×3 computing parameter to the 3×3 local filtering computing unit 1211d. That is, the sub-3×3 local register assembly 1211cb outputs the 3×3 computing parameter to the 3×3 local filtering computing unit 1211d when the sub-3×3 local register assembly 1211ca is configured to store the 3×3 weight parameter. When the sub-3×3 local register assembly 1211cb is configured to store the 3×3 weight parameter, the sub-3×3 local register assembly 1211ca outputs the 3×3 computing parameter to the 3×3 local filtering computing unit 1211d. That is, the 3×3 local register assemblies 1211c of the present disclosure apply a ping-pong method to store the 3×3 weight parameters and output the 3×3 computing parameters.

The 3×3 local filtering computing unit 1211d can perform the 3×3 convolutional computation according to the 3×3 computing parameters and the input data 106 for producing a 3×3 computing data. For example, an image block of the input data 106 has a block size of 6×4. The 3×3 local filtering computing unit 1211d can perform a 3×3 convolutional computation according to the 3×3 computing parameters and the input data 106. In order to perform a highly parallel computation, the convolutional neural network processor 100 can set up a plurality of multipliers in the 3×3 computing sub-module 1211. The number of the multipliers in the 3×3 local filtering computing unit 1211d can be 73728. After the 3×3 post-processing computing unit 1211e receives the 3×3 computing data, which is produced by the 3×3 local filtering computing unit 1211d, and the 3×3 bias parameter, which is produced by the bias distributor, the 3×3 post-processing computation can be performed according to the 3×3 computing data and the 3×3 bias parameter for producing the 3×3 post-processing computing data 1062. In FIG. 3 and FIG. 4, the 3×3 post-processing computing data 1062 is the output data 108 of the convolutional neural network processor 100.

In FIG. 2, the convolutional neural network inference unit 120 further includes a controller 122. The controller 122 is electrically connected to the information decode unit 110. In detail, the controller 122 is electrically connected to the command decoder 1112 for receiving the operational command and further controlling the 3×3 computing sub-module 1211 and the bias distributor 1212 of the computing module 121 according to the operational command.

Figure 5:
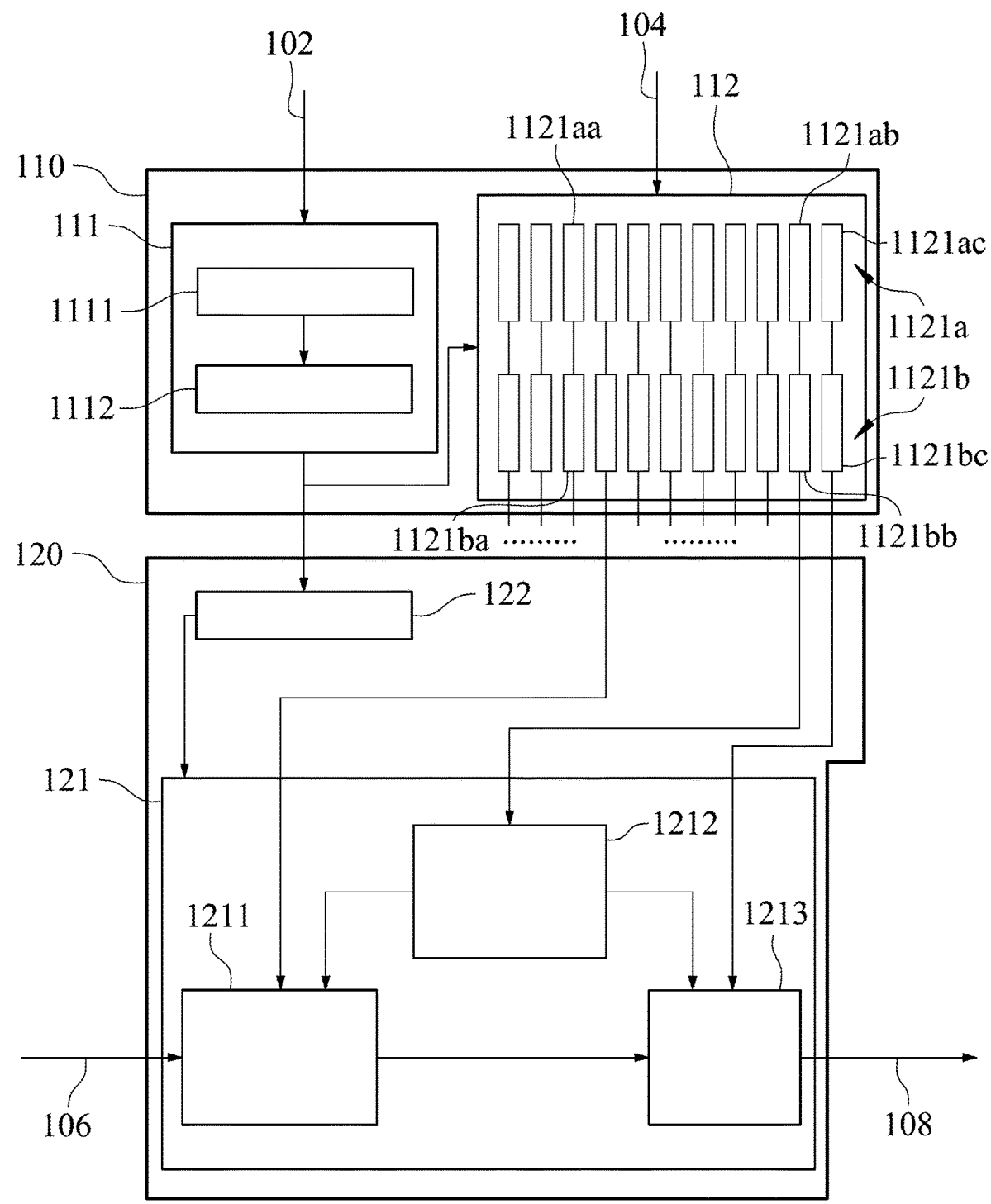
Figure 6:
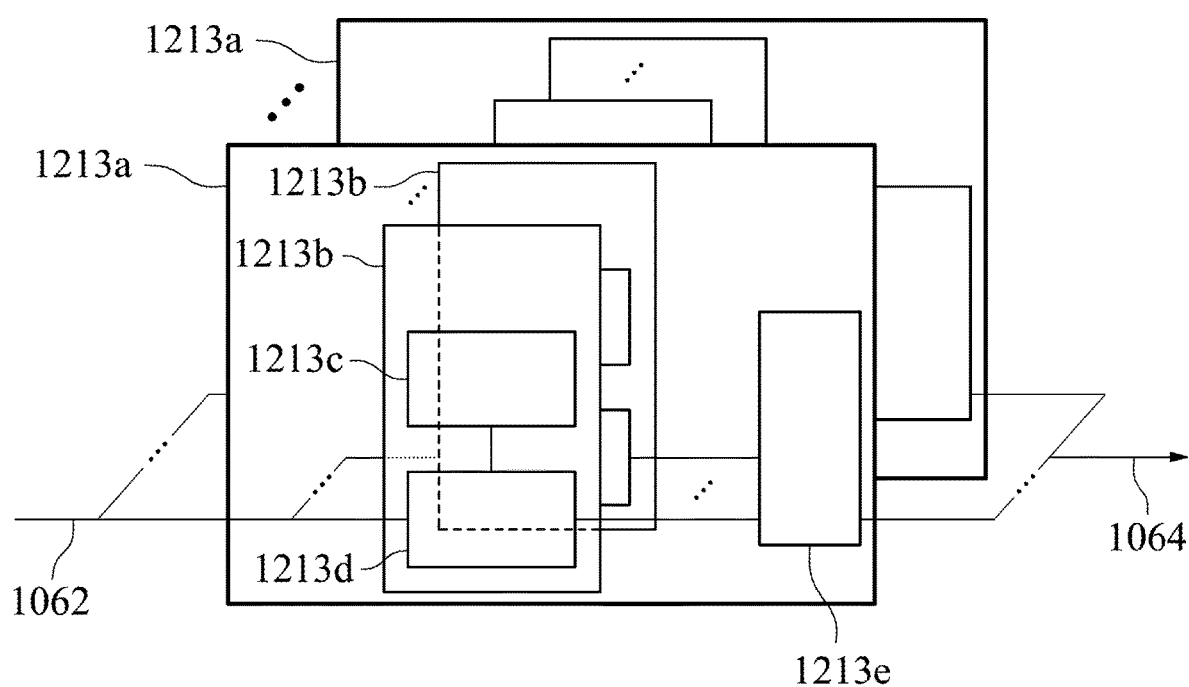
Figure 7:
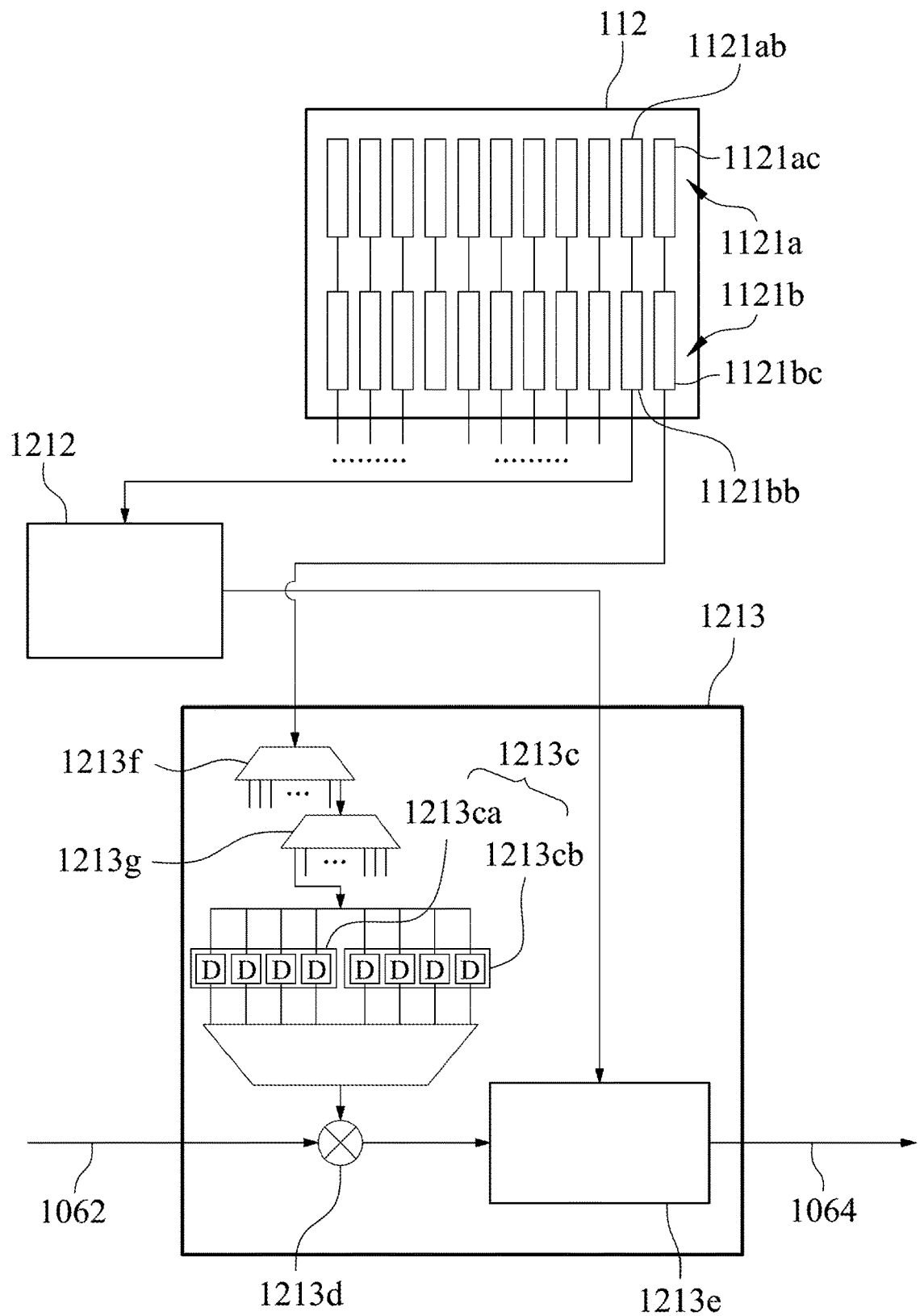

FIG. 5 is a block diagram showing a convolutional neural network processor 100 according to an embodiment of further another structural aspect of the present disclosure. FIG. 6 is a block diagram showing a 1×1 computing sub-module 1213 of the convolutional neural network processor 100 of FIG. 5, and FIG. 7 is a schematic view showing a 1×1 local convolutional computing unit 1213b of the 1×1 computing sub-module 1213 in FIG. 6. Differences between the convolutional neural network processor 100 of FIG. 5 and the convolutional neural network processor 100 of FIG. 2 are that the parallel sub-memories 1121a of the convolutional neural network processor 100 of FIG. 5 further include at least one second parallel sub-memory 1121ac, the parallel sub-processors 1121b further include at least one second parallel sub-processor 1121bc, and the computing module 121 further includes a 1×1 computing sub-module 1213. In addition, the weight parameter inputs 104 further include at least one second input weight parameter. The weight parameter outputs further include at least one second output weight parameter. The at least one second parallel sub-memory 1121ac is configured to parallelly receive and store the at least one second input weight parameter, respectively, and the at least one second parallel sub-processor 1121bc is electrically connected to the at least one second parallel sub-memory 1121ac, respectively. The at least one second parallel sub-processor 1121bc is configured to receive the at least one second input weight parameter according to the operational command to output the at least one second output weight parameter. The configuration of the 3×3 computing sub-module 1211 is the same as the 3×3 computing sub-module 1211 of the convolutional neural network processor 100 of FIG. 2, and there is no need for further description. In FIG. 5, the quantity of the first parallel sub-memories 1121aa and that of the first parallel sub-processors 1121ba are both nine. The quantity of the second parallel sub-memory 1121aa and that of the second parallel sub-processor 1121bc are both one. However, in some other embodiments, the quantity of the second parallel sub-memories 1121aa and that of the second parallel sub-processors 1121bc are both two when the quantity of the first parallel sub-memories 1121aa and that of the first parallel sub-processors 1121ba are both eighteen. The quantity of the bias parallel sub-memory 1121ab and that of the bias parallel sub-processor 1121bb are both one, but the present disclosure is not limited thereto.

In detail, after receiving the weight parameter inputs 104, the parallel processing module 112 stores the first input weight parameters of the weight parameter inputs 104 in the first parallel sub-memories 1121aa. The parallel processing module 112 stores the second input weight parameter of the weight parameter inputs 104 in the second parallel sub-memory 1121ac, and stores the bias input parameter in the bias parallel sub-memory 1121ab. The operations of the first parallel sub-processors 1121ba and the bias parallel sub-processor 1121bb of FIG. 5 are the same as the first parallel sub-processors 1121ba and the bias parallel sub-processor 1121bb shown in FIG. 2. The second parallel sub-processor 1121bc reads the second input weight parameter from the second parallel sub-memory 1121ac according to the operational command for processing and producing the second output weight parameter.

The 1×1 computing sub-module 1213 is electrically connected to the at least one second parallel sub-processor 1121bc and the 3×3 computing sub-module 1211 and computes for producing a 1×1 post-processing computing data 1064 according to the at least one second output weight parameter and the 3×3 post-processing computing data 1062. The 1×1 computing sub-module 1213 includes at least one 1×1 convolutional distributor assembly, a plurality of 1×1 local convolutional computing units 1213b and a plurality of 1×1 post-processing computing units 1213e. The at least one 1×1 convolutional distributor assembly is electrically connected to the at least one second parallel sub-processor 1121bc to receive and distribute a plurality of 1×1 weight parameters of the at least one second output weight parameter. The 1×1 local convolutional computing units 1213b are electrically connected to the at least one 1×1 convolutional distributor assembly. Each of the 1×1 local convolutional computing units 1213b includes a 1×1 local register assembly 1213c and a 1×1 local filtering computing unit 1213d. The 1×1 local register assembly 1213c is electrically connected to the at least one 1×1 convolutional distributor assembly, so that the 1×1 local register assembly 1213c of the 1×1 local convolutional computing units 1213b receives and stores the 1×1 weight parameters of the at least one second output weight parameter for outputting a plurality of 1×1 computing parameters according to the 1×1 weight parameters of the at least one second output weight parameter. The 1×1 local filtering computing unit 1213d is electrically connected to the 1×1 local register assembly 1213c, so that the 1×1 local filtering computing unit 1213d of the 1×1 local convolutional computing units 1213b computes for producing a plurality of 1×1 computing data according to the 1×1 computing parameters and the 3×3 post-processing computing data 1062. In detail, the 1×1 local filtering computing units 1213d can perform a 1×1 convolutional computation. When the quantity of the second parallel sub-processors 1121bc is one, spatial filter positions of the 1×1 local filtering computing unit 1213d are corresponding to the second parallel sub-processor 1121bc. When the quantity of the second parallel sub-processors 1121bc is two, the spatial filter positions of the 1×1 local filtering computing unit 1213d are corresponding to two second parallel sub-processors 1121bc. The present disclosure is listed as above and so on without further description. The 1×1 post-processing computing units 1213e are electrically connected to the 1×1 local convolutional computing units 1213b and performing a 1×1 post-processing computation according to the 1×1 computing data for producing the 1×1 post-processing computing data 1064. The output data 108 of the convolutional neural network processor 100 may be the 1×1 post-processing computing data 1064. The bias parallel sub-memory 1121ab and the bias parallel sub-processor 1121bb of FIG. 5 are the same as the bias parallel sub-memory 1121ab and the bias parallel sub-processor 1121bb of FIG. 2, so that there is no further description herein. The configuration of the bias distributor 1212 and the 3×3 computing sub-module 1211 in FIG. 5 is also the same as the configuration of the bias distributor 1212 and the 3×3 computing sub-module 1211 in FIG. 2.

In detail, the bias distributor 1212 of FIG. 5 is electrically connected to the bias parallel sub-processor 1121bb, the 3×3 computing sub-module 1211 and the 1×1 computing sub-module 1213. The bias distributor 1212 produces a plurality of 3×3 bias parameters and a plurality of 1×1 bias parameters according to the bias output parameter. The bias distributor 1212 outputs the 3×3 bias parameters to the 3×3 post-processing computing units 1211e. The bias distributor 1212 outputs the 1×1 bias parameters to the 1×1 post-processing computing units 1213e.

In FIG. 6, the 1×1 computing sub-module 1213 includes a plurality of 1×1 computing circuits 1213a, in which the number of the 1×1 computing circuits 1213a can be 32. Each of the 1×1 computing circuits 1213a is composed of a plurality of 1×1 local convolutional computing units 1213b and a 1×1 post-processing computing unit 1213e, in which the number of the 1×1 local convolutional computing units 1213b can be 32. That is, the number of the 1×1 local convolutional computing units 1213b of the 1×1 computing sub-module 1213 is 1024. The number of the 1×1 post-processing computing units 1213e is 32.

Please refer to FIG. 6 and FIG. 7. After the 1×1 computing sub-module 1213 receives the 1×1 weight parameters of the second output weight parameter, the 1×1 weight parameters can be distributed to the 1×1 local convolutional computing units 1213b by the 1×1 convolutional distributor assembly. In FIG. 7, the 1×1 convolutional distributor assembly utilizes a two-stage distribution method and includes a first 1×1 convolutional distributor 1213f and a plurality of second 1×1 convolutional distributors 1213g. The operation of the 1×1 convolutional distributor assembly is the same as the operation of the 3×3 convolutional distributor assembly, and there is no further description. The 1×1 local register assembly 1213c includes two sub-1×1 local register assemblies 1213ca, 1213cb. The two sub-1×1 local register assemblies 1213ca, 1213cb can be configured with a multiplexer for alternately storing one of the 1×1 weight parameters or outputting the 1×1 computing parameter to the 1×1 local filtering computing unit 1213d. The operation of the 1×1 local register assembly 1213c is the same as the operation of the 3×3 local register assembly 1211c. That is, both the 3×3 local register assembly 1211c and the 1×1 local register assembly 1213c of the present disclosure apply a ping-pong method. Thus, the 1×1 local filtering computing unit 1213d can perform the 1×1 post-processing computation for producing the 1×1 computing data according to the 1×1 computing parameters and the 3×3 post-processing computing data 1062. In FIG. 5, FIG. 6 and FIG. 7, the 1×1 post-processing computing data 1064 can be the output data 108 of the convolutional neural network processor 100.

In order to perform a highly parallel computation, the convolutional neural network processor 100 can set up a plurality of multipliers in the 3×3 computing sub-module 1211 and the 1×1 computing sub-module 1213. For example, the number of the multipliers in the 3×3 local filtering computing unit 1211d can be 73728, and the number of the multipliers in the 1×1 local filtering computing unit 1213d can be 8192. In addition, the controller 122 of FIG. 5 is the same as the controller 122 of FIG. 2.

Figure 8:
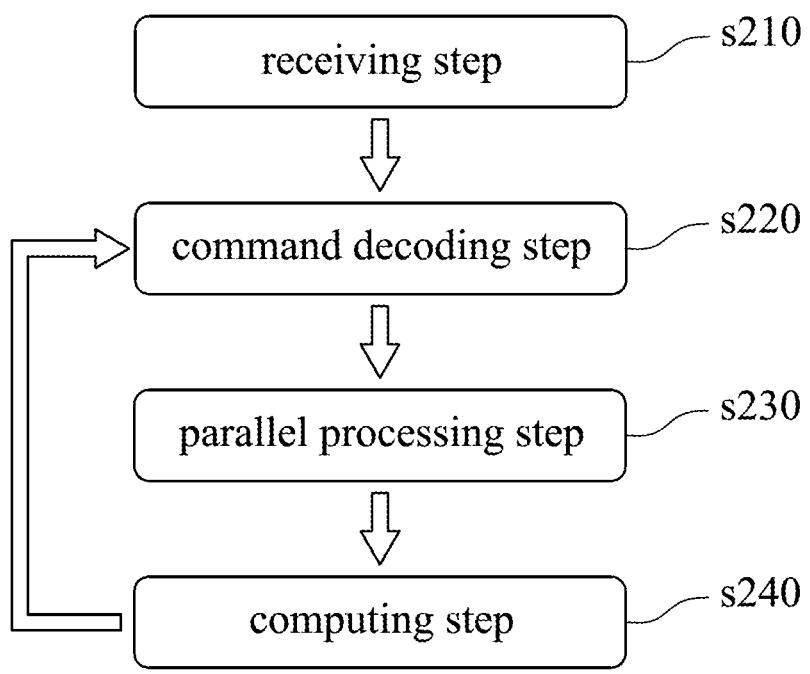

FIG. 8 is a flow chart showing a data processing method s200 of a convolutional neural network processor according to an embodiment of a methodical aspect of the present disclosure. In FIG. 8, the data processing method s200 of the convolutional neural network processor includes a receiving step s210, a command decoding step s220, a parallel processing step s230 and a computing step s240.

In coordination with FIG. 1, the receiving step s210 is performed for driving the information decode unit 110 to receive the program input 102 and the weight parameter inputs 104. The information decode unit 110 includes the decoding module 111 and the parallel processing module 112. The command decoding step s220 is performed for driving the decoding module 111 to receive the program input 102 and output an operational command according to the program input 102. The parallel processing step s230 is performed for driving the parallel processing module 112 to receive the weight parameter inputs 104 and parallelly process the weight parameter inputs 104 according to the operational command for producing a plurality of weight parameter outputs. The computing step s240 is performed for driving the computing module 121 to receive an input data 106 and the weight parameter outputs and compute the input data 106 and the weight parameter outputs according to the operational command for producing an output data 108. That is, the information decode unit 110 of the convolutional neural network processor 100 can receive the program input 102 and the weight parameter inputs 104 via the receiving step s210 for executing the command decoding step s220 and the parallel processing step s230. The parallel processing module 112 is electrically connected to the decoding module 111, and thus the parallel processing module 112 can produce the weight parameter outputs, that is, the parallel processing step s230, according to the operational command produced by the decoding module 111 in the command decoding step s220. In addition, the computing module 121 is electrically connected to the parallel processing module 112. After receiving the input data 106 and the weight parameter outputs, the computing module 121 can compute for producing the output data 108 in the computing step s240 according to the input data 106 and the weight parameter outputs. Accordingly, the data processing method s200 of a convolutional neural network processor utilizes the receiving step s210, the command decoding step s220, the parallel processing step s230 and the computing step s240 for driving the decoding module 111 and the parallel processing module 112 of the information decode unit 110. Furthermore, the computing module 121 of the convolutional neural network inference unit 120 can perform a highly parallel computation for further providing high-performance and power-efficient computation.

For example, in FIG. 8, the program input 102 and the weight parameter inputs 104 received in the receiving step s210 of the data processing method s200 of the convolutional neural network processor can include related commands and parameters corresponding to the input data 106. When the command decoding step s220 and the parallel processing step s230 are executed, the related commands and parameters corresponding to the input data 106 are stored in the program memory 1111 and the parallel sub-memories 1121a. When the command decoding step s220 and the parallel processing step s230 are executed, the related commands and parameters corresponding to one of the input data 106 can be processed so as to perform a computation for the one of the input data 106 in the computing step s240. In the meanwhile, during the computing step s240, the data processing method s200 of the convolutional neural network processor can process the related commands and parameters of another one of the input data 106. That is, the command decoding step s220 and the parallel processing step s230 can be executed on the another one of the input data 106. In other words, the data processing method s200 of the convolutional neural network processor stores related commands and parameters of whole input data 106 in the program memory 1111 and the parallel sub-memories 1121a at first. Then, the command decoding step s220, the parallel processing step s230 and the computing step s240 of each of the input data 106 are executed. In addition, when the computing step s240 is executed for computing the one of the input data 106, the command decoding step s220 and the parallel processing step s230 can be executed for processing the related commands and parameters of the another one of the input data 106. Thus, the data processing method s200 of the convolutional neural network processor can individually compute each of the input data 106 after executing the receiving step s210.

Figure 9:
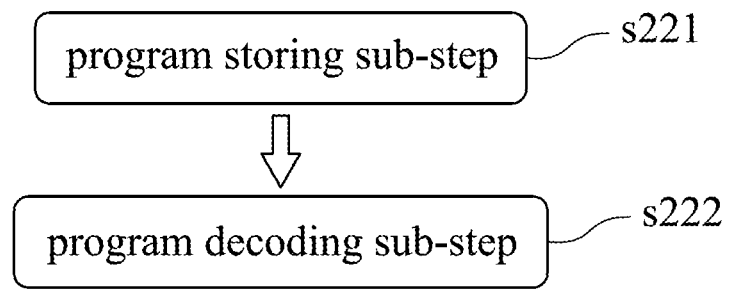

FIG. 9 is a flow chart of the command decoding step s220 shown in the data processing method s200 of the convolutional neural network processor of FIG. 8. The decoding module 111 can include the program memory 1111 and the command decoder 1112. The command decoding step s220 can include a program storing sub-step s221 and a program decoding sub-step s222. The program storing sub-step s221 is performed for driving the program memory 1111 to store the program input 102. The program decoding sub-step s222 is performed for driving the command decoder 1112 to decode the program input 102 so as to produce the operational command. That is, the convolutional neural network processor 100 can drive the decoding module 111 via the program storing sub-step s221 and the program decoding sub-step s222 for receiving the program input 102 and storing the received program input 102 in the program memory 1111. Then, the program input 102 can be decoded by utilizing the command decoder 1112 so as to produce the operational command.

Figure 10:
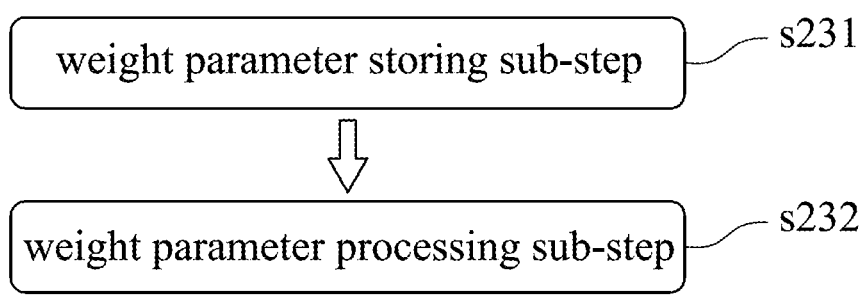

FIG. 10 is a flow chart of the parallel processing step s230 shown in the data processing method s200 of the convolutional neural network processor of FIG. 8. The parallel processing module 112 can include a plurality of parallel sub-memories 1121a and a plurality of parallel sub-processors 1121b. The parallel processing step s230 includes a weight parameter storing sub-step s231 and a weight parameter processing sub-step s232. The weight parameter storing sub-step s231 is performed for driving the parallel sub-memories 1121a to parallelly store the weight parameter inputs 104. The weight parameter processing sub-step s232 is performed for driving the parallel sub-processors 1121b. The parallel sub-processors 1121b parallelly read the weight parameter inputs 104 and perform an operation according to the operational command for producing the weight parameter outputs. That is, the convolutional neural network processor 100 can drive the parallel processing module 112 via the weight parameter storing sub-step s231 and the weight parameter processing sub-step s232 for receiving the weight parameter inputs 104 and storing the weight parameter inputs 104 in the parallel sub-memories 1121a. Then, the parallel sub-processors 1121b perform an operation to the weight parameter inputs 104 stored in the parallel sub-memories 1121a according to the operational command for producing the weight parameter outputs. When the weight parameter inputs 104 have a non-compressed form, the operation is performed to store the weight parameter inputs having the non-compressed form. When the weight parameter inputs 104 have a compressed form, the operation is performed to store and decompress the weight parameter inputs having the compressed form.

Figure 11:
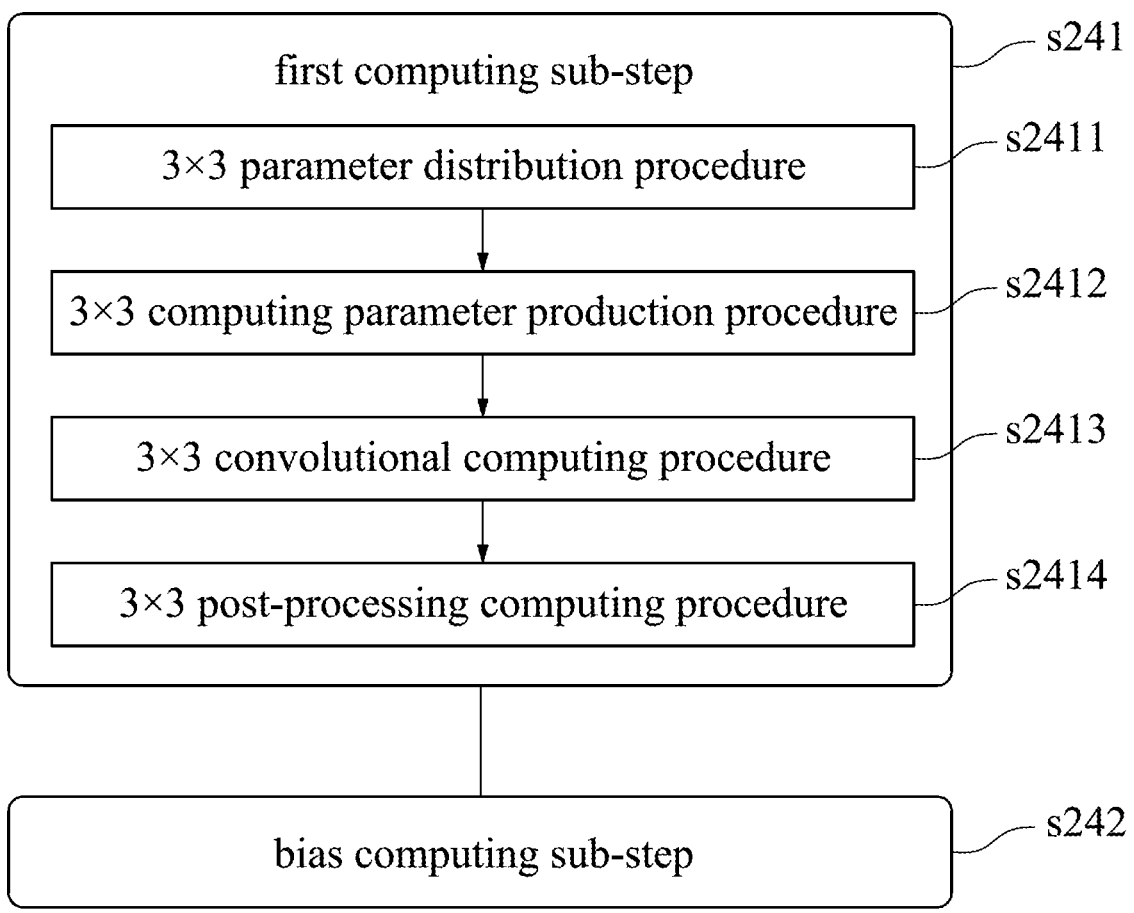

FIG. 11 is a flow chart of the computing step s240 shown in the data processing method s200 of the convolutional neural network processor of FIG. 8. In coordination with FIG. 2, FIG. 3 and FIG. 4, the weight parameter outputs can include a plurality of first output weight parameters and a bias output parameter. The first output weight parameter includes a plurality of 3×3 weight parameters. The computing module 121 can include a 3×3 computing sub-module 1211 and a bias distributor 1212. The 3×3 computing sub-module 1211 includes a plurality of 3×3 convolutional distributor assemblies, a plurality of 3×3 local convolutional computing units 1211b and a plurality of 3×3 post-processing computing units 1211e. The computing step s240 can include a first computing sub-step s241 and a bias computing sub-step s242. The first computing sub-step s241 includes a 3×3 parameter distribution procedure s2411, a 3×3 computing parameter production procedure s2412, a 3×3 convolutional computing procedure s2413 and a 3×3 post-processing computing procedure s2414. The 3×3 parameter distribution procedure s2411 is performed for driving the 3×3 convolutional distributor assemblies to receive the 3×3 weight parameters of the first output weight parameters and distribute the 3×3 weight parameters of the first output weight parameters to the 3×3 local convolutional computing units 1211b, in which each of the 3×3 local convolutional computing units 1211b includes a 3×3 local register assembly 1211c and a 3×3 local filtering computing unit 1211d. The 3×3 computing parameter production procedure s2412 is performed for driving the 3×3 local register assemblies 1211c of the 3×3 local convolutional computing units 1211b to receive the 3×3 weight parameters of the first output weight parameters and produce a plurality of 3×3 computing parameters according to the 3×3 weight parameters of the first output weight parameters. The 3×3 convolutional computing procedure s2413 is performed for driving the 3×3 local filtering computing units 1211d of the 3×3 local convolutional computing units 1211b to perform a 3×3 convolutional computation to the 3×3 computing parameters and the input data 106 for producing a plurality of 3×3 computing data. The 3×3 post-processing computing procedure s2414 is performed for driving the 3×3 post-processing computing units 1211e to perform a 3×3 post-processing computation to the 3×3 computing data for producing the 3×3 post-processing computing data 1062. The bias computing sub-step s242 is performed for driving the bias distributor 1212 to produce a plurality of 3×3 bias parameters according to the bias output parameter and provide the 3×3 bias parameters to the 3×3 computing sub-module 1211. That is, the convolutional neural network processor 100 can produce the 3×3 post-processing computing data 1062 via the first computing sub-step s241 and the bias computing sub-step s242. In detail, the 3×3 computing sub-module 1211 can be configured to execute the first computing sub-step s241. The 3×3 convolutional distributor assemblies of the 3×3 computing sub-module 1211 can execute the 3×3 parameter distribution procedure s2411 to distribute the 3×3 weight parameters to the 3×3 local register assembly 1211c of different 3×3 local convolutional computing units 1211b, and it is beneficial for the 3×3 local register assembly 1211c to execute the 3×3 computing parameter production procedure s2412. Each of the 3×3 local register assemblies 1211c can include two sub-3×3 local register assemblies 1211ca, 1211cb. The two sub-3×3 local register assemblies 1211ca, 1211cb can be operated via a ping-pong method for receiving the 3×3 weight parameter and outputting the 3×3 computing parameter to the 3×3 local filtering computing unit 1211d. In the 3×3 convolutional computing procedure s2413, the 3×3 local filtering computing unit 1211d performs the 3×3 convolutional computation for producing a plurality of 3×3 computing data according to the 3×3 computing parameters and the input data 106. In the 3×3 post-processing computing procedure s2414, the 3×3 post-processing computing unit 1211e performs the 3×3 post-processing computation according to the 3×3 computing data and the 3×3 bias parameter, which is outputted by the bias distributor 1212 in the bias computing sub-step s242, for producing the 3×3 post-processing computing data 1062. Referring to FIG. 2, FIG. 3, FIG. 4 and FIG. 11, the 3×3 post-processing computing data 1062 can be the output data 108 of the convolutional neural network processor 100.

Figure 12:
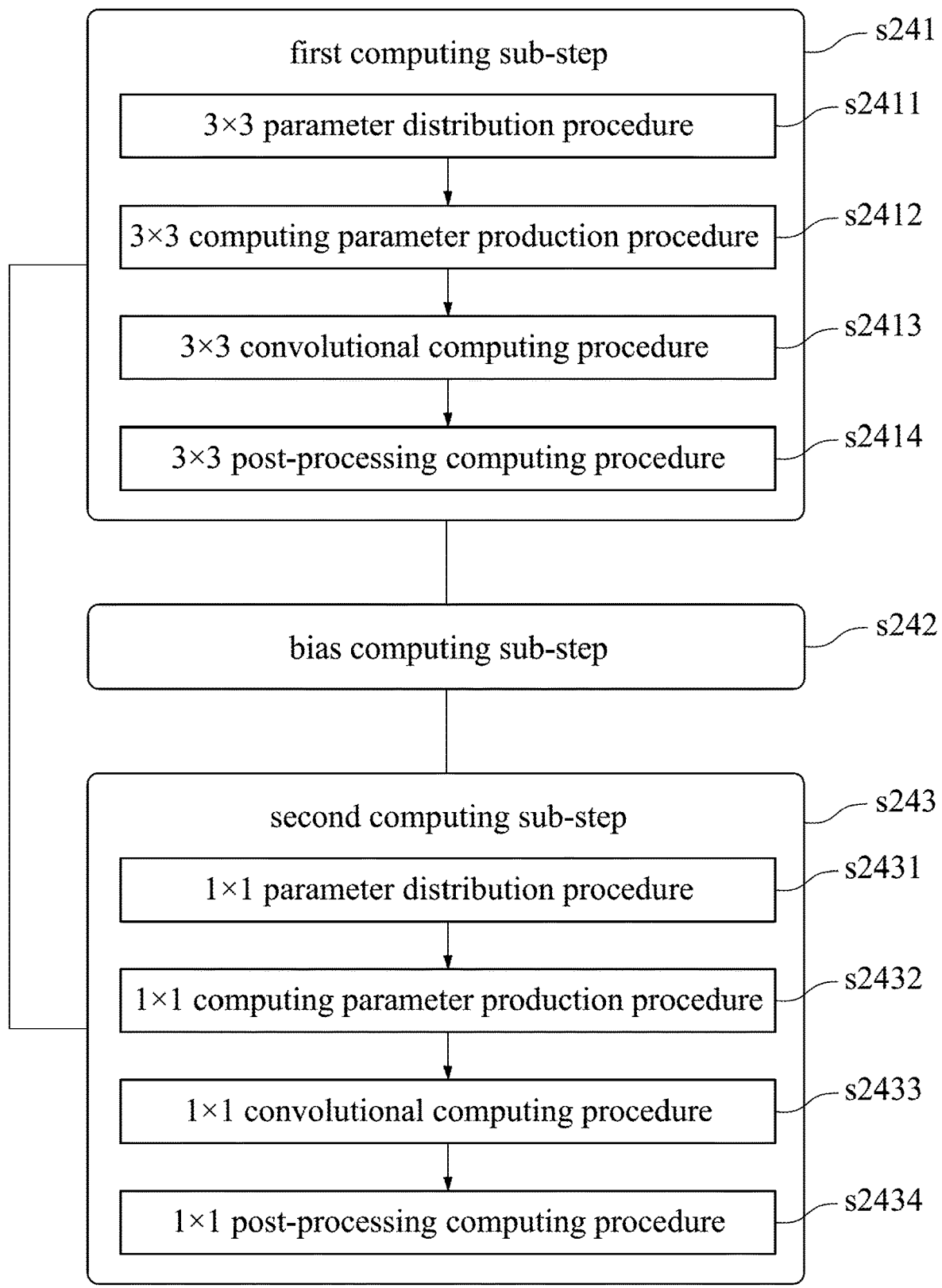

FIG. 12 is a flow chart of a computing step s240 of the data processing method s200 of the convolutional neural network processor according to another embodiment of the methodical aspect in FIG. 8. In coordination with FIG. 5, FIG. 6 and FIG. 7, the weight parameter outputs can include a plurality of first output weight parameters, at least one second output weight parameter and a bias output parameter. The first output weight parameter includes a plurality of 3×3 weight parameters, and the at least one second output weight parameter includes a plurality of 1×1 weight parameters. The computing module 121 can include a 3×3 computing sub-module 1211, a 1×1 computing sub-module 1213 and a bias distributor 1212. The 3×3 computing sub-module 1211 includes a plurality of 3×3 convolutional distributor assemblies, a plurality of 3×3 local convolutional computing units 1211b and a plurality of 3×3 post-processing computing units 1211e. The 1×1 computing sub-module 1213 includes a plurality of 1×1 convolutional distributor assemblies, a plurality of 1×1 local convolutional computing units 1213b and a plurality of 1×1 post-processing computing units 1213e. The computing step s240 can include a first computing sub-step s241, a second computing sub-step s243 and a bias computing sub-step s242. The first computing sub-step s241 of FIG. 12 is the same as the first computing sub-step s241 of FIG. 11. The second computing sub-step s243 is performed for driving the 1×1 computing sub-module 1213 to receive the 3×3 post-processing computing data and the at least one second output weight parameter so as to produce a 1×1 post-processing computing data 1064. The second computing sub-step s243 includes a 1×1 parameter distribution procedure s2431, a 1×1 computing parameter production procedure s2432, a 1×1 convolutional computing procedure s2433 and a 1×1 post-processing computing procedure s2434. The 1×1 parameter distribution procedure s2431 is performed for driving the at least one 1×1 convolutional distributor assembly to receive the 1×1 weight parameters of the at least one second output weight parameter and distribute the 1×1 weight parameters of the at least one second output weight parameter to the 1×1 local convolutional computing units 1213b, in which each of the 1×1 local convolutional computing units 1213b includes a 1×1 local register assembly 1213c and a 1×1 local filtering computing unit 1213d. The 1×1 computing parameter production procedure s2432 is performed for driving the 1×1 local register assemblies 1213c of the 1×1 local convolutional computing units 1213b to receive the 1×1 weight parameters of the at least one second output weight parameter and produce a plurality of 1×1 computing parameters according to the 1×1 weight parameters of the at least one second output weight parameter. The 1×1 convolutional computing procedure s2433 is performed for driving the 1×1 local filtering computing unit 1213d of the 1×1 local convolutional computing units 1213b to perform a 1×1 convolutional computation to the 1×1 computing parameters and the 3×3 post-processing computing data 1062 for producing a plurality of 1×1 computing data. The 1×1 post-processing computing procedure s2434 is performed for driving the 1×1 post-processing computing units 1213e to perform a 1×1 post-processing computation to the 1×1 computing data for producing the 1×1 post-processing computing data 1064. That is, the convolutional neural network processor 100 can produce the 1×1 post-processing computing data 1064 via the first computing sub-step s241, the second computing sub-step s243 and the bias computing sub-step s242. In detail, the 1×1 computing sub-module 1213 can be configured to execute the second computing sub-step s243. The 1×1 convolutional distributor assembly of the 1×1 computing sub-module 1213 can execute the 1×1 parameter distribution procedure s2431 to distribute the 1×1 weight parameters to the 1×1 local register assembly 1213c of different 1×1 local convolutional computing units 1213b, and it is beneficial for the 1×1 local register assembly 1213c to execute the 1×1 computing parameter production procedure s2432. Each of the 1×1 local register assemblies 1213c can include two sub-1×1 local register assemblies 1213ca, 1213cb. The two sub-1×1 local register assemblies 1213ca, 1213cb can be operated via a ping-pong method for receiving the 1×1 weight parameters and outputting the 1×1 computing parameter to the 1×1 local filtering computing unit 1213d. In the 1×1 convolutional computing procedure s2433, the 1×1 local filtering computing unit 1213d performs the 1×1 convolutional computation for producing a plurality of 1×1 computing data according to the 1×1 computing parameters and the 3×3 post-processing computing data 1062. In the 1×1 post-processing computing procedure s2434, the 1×1 post-processing computing unit 1213e performs the 1×1 post-processing computation according to the 1×1 computing data and the 1×1 bias parameter, which is outputted by the bias distributor 1212 in the bias computing sub-step s242, for producing the 1×1 post-processing computing data 1064. Referring to FIG. 5, FIG. 6, FIG. 7 and FIG. 12, the 1×1 post-processing computing data 1064 can be the output data 108 of the convolutional neural network processor 100.

Please refer to FIGS. 5-10 and FIG. 12. In detail, the convolutional neural network processor 100 can execute the data processing method s200 of the convolutional neural network processor 100 and include the information decode unit 110 and the convolutional neural network inference unit 120. The information decode unit 110 can execute the receiving step s210, the command decoding step s220 and the parallel processing step s230. After the decoding module 111 receives the program input 102 in the receiving step s210, it stores the program input 102 via the program memory 1111 in the program storing sub-step s221 and decodes the program input 102 by the command decoder 1112 in the program decoding sub-step s222 for outputting the operational command to the parallel processing module 112 and the controller 122 of the convolutional neural network inference unit 120. In particular, the program input 102 can include related commands corresponding to a plurality of input data 106. In short, the command decoder 1112 will decode the related commands corresponding to one of the input data 106 in the program decoding sub-step s222 so as to output the operational command. After the controller 122 receives the operational command, it can control the computing module 121 according to the operational command. The parallel processing module 112 receives the weight parameter inputs 104 in the receiving step s210 and executes the parallel processing step s230. The weight parameter inputs 104 include the first input weight parameters, the second input weight parameters and the bias input parameters, in which the number of the first input weight parameters can be a multiple of 9216, the number of the second input weight parameters can be a multiple of 1024, and the number of the bias input parameters can be a multiple of 64. That is, the weight parameter inputs 104 include related parameters corresponding to the input data 106. In the weight parameter storing sub-step s231, the first parallel sub-memory 1121aa, the second parallel sub-memory 1121ac and the bias parallel sub-memory 1121ab are configured to store the first input weight parameter, the second input weight parameter and the bias input parameter, respectively. The number of the first parallel sub-memories 1121aa is nine, the numbers of the second parallel sub-memory 1121ac and the bias parallel sub-memory 1121ab are both 1. In addition, the number of the first parallel sub-processors 1121ba is nine, the numbers of the second parallel sub-processor 1121bc and the bias parallel sub-processor 1121bb are both 1. In the weight parameter processing sub-step s232, the numbers of the first input weight parameter and the second input weight parameter processed, separately, by the first parallel sub-processor 1121ba and the second parallel sub-processor 1121bc are both 4 in each cycle. The first parallel sub-processor 1121ba and the second parallel sub-processor 1121bc will, respectively, take 256 cycles to process the first input weight parameter and the second input weight parameter, which are corresponding to one of the input data 106, for outputting the first output weight parameter and the second output weight parameter. The bias parallel sub-processor 1121bb will take 64 cycles to process the bias input parameter, which is corresponding to one of the input data 106, for outputting the bias output parameter. Accordingly, the convolutional neural network processor 100 can parallelly process the weight parameter inputs 104 via the receiving step s210, the command decoding step s220 and the parallel processing step s230.

The computing module 121 of the convolutional neural network inference unit 120 can execute the computing step s240 and includes the 3×3 computing sub-module 1211, the bias distributor 1212 and the 1×1 computing sub-module 1213. The bias distributor 1212 can execute the bias computing sub-step s242. In the bias computing sub-step s242, the bias distributor 1212 receives the 3×3 bias parameters and the 1×1 bias parameters and distributes the 3×3 bias parameters to the 3×3 post-processing computing units 1211e of the 3×3 computing sub-module 1211. It is beneficial for the 3×3 post-processing computing units 1211e to execute the 3×3 post-processing computing procedure s2414. The bias distributor 1212 also distributes the 1×1 bias parameters to the 1×1 post-processing computing units 1213e of the 1×1 computing sub-module 1213, and it is beneficial for the 1×1 post-processing computing units 1213e to execute the 1×1 post-processing computing procedure s2434.

The 3×3 computing sub-module 1211 can execute the first computing sub-step s241 and includes the 3×3 convolutional distributor assemblies, the 3×3 local convolutional computing units 1211b and the 3×3 post-processing computing units 1211e. Each of the 3×3 convolutional distributor assemblies is electrically connected to one of the first parallel sub-processors 1121ba so that the 3×3 convolutional distributor assemblies can receive and distribute the 3×3 weight parameters to the 3×3 local convolutional computing units 1211b in the 3×3 parameter distribution procedure s2411, and it is beneficial for the 3×3 local convolutional computing units 1211b to execute the 3×3 computing parameter production procedure s2412 and the 3×3 convolutional computing procedure s2413. Each of the 3×3 local convolutional computing units 1211b includes a 3×3 local register assembly 1211c and a 3×3 local filtering computing unit 1211d. The 3×3 local register assemblies 1211c can execute the 3×3 computing parameter production procedure s2412 and includes two sub-3×3 local register assemblies 1211ca, 1211cb. The two sub-3×3 local register assemblies 1211ca, 1211cb can perform the 3×3 computing parameter production procedure s2412 via a ping-pong method for outputting the 3×3 computing parameter to the 3×3 local filtering computing unit 1211d. In the 3×3 convolutional computing procedure s2413, the 3×3 local filtering computing unit 1211d performs the 3×3 convolutional computation according to the 3×3 computing parameters and the input data 106 for producing the 3×3 computing data. The spatial filter positions of the 3×3 convolutional computation can be, respectively, corresponding to one of the first parallel sub-processors 1121ba. In the 3×3 post-processing computing procedure s2414, the 3×3 post-processing computing units 1211e performs the 3×3 post-processing computation according to the 3×3 computing data and the 3×3 bias parameter for producing the 3×3 post-processing computing data 1062.

The 1×1 computing sub-module 1213 can execute the second computing sub-step s243 and includes the at least one 1×1 convolutional distributor assembly, the 1×1 local convolutional computing units 1213b and the 1×1 post-processing computing units 1213e. The 1×1 convolutional distributor assembly is electrically connected to the at least one second parallel sub-processor 1121bc to receive and distribute the 1×1 weight parameters to the 1×1 local convolutional computing units 1213b in the 1×1 parameter distribution procedure s2431, and it is beneficial for the 1×1 local convolutional computing units 1213b to execute the 1×1 computing parameter production procedure s2432 and the 1×1 convolutional computing procedure s2433. Each of the 1×1 local convolutional computing units 1213b includes a 1×1 local register assembly 1213c and a 1×1 local filtering computing unit 1213d. The 1×1 local register assemblies 1213c can execute the 1×1 computing parameter production procedure s2432 and includes two sub-1×1 local register assemblies 1213ca, 1213cb. The two sub-1×1 local register assemblies 1213ca, 1213cb can perform the 1×1 computing parameter production procedure s2432 via a ping-pong method for outputting the 1×1 computing parameter to the 1×1 local filtering computing unit 1213d. In the 1×1 convolutional computing procedure s2433, the 1×1 local filtering computing unit 1211d performs the 1×1 convolutional computation according to the 1×1 computing parameters and the 3×3 post-processing computing data 1062, which is produced in the 3×3 post-processing computing procedure s2414, for producing the 1×1 computing data. The spatial filter positions of the 1×1 convolutional computation can be, respectively, corresponding to the at least one second parallel sub-processors 1121bc. In the 1×1 post-processing computing procedure s2434, the 1×1 post-processing computing units 1213e performs the 1×1 post-processing computation according to the 1×1 computing data and the 1×1 bias parameter for producing the 1×1 post-processing computing data 1064. The 1×1 post-processing computing data 1064 outputted in the 1×1 post-processing computing procedure s2434 is the output data 108 produced from the data processing method s200 of the convolutional neural network processor executed by the convolutional neural network processor 100.

To sum up, the convolutional neural network processor 100 can perform a highly parallel computation for further providing high-performance and power-efficient computation by executing the abovementioned data processing method s200 of the convolutional neural network processor.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A convolutional neural network processor configured to compute an input data, comprising:
    an information decode unit configured to receive a program input and a plurality of weight parameter inputs and comprising:
        a decoding module receiving the program input and outputting an operational command according to the program input;
        a parallel processing module electrically connected to the decoding module, receiving the weight parameter inputs and comprising a plurality of parallel processing sub-modules, wherein the parallel processing sub-modules produce a plurality of weight parameter outputs according to the operational command and the weight parameter inputs; and
    a convolutional neural network inference unit electrically connected to the information decode unit and comprising:
        a computing module electrically connected to the parallel processing module, wherein the computing module computes to produce an output data according to the input data and the weight parameter outputs;
    wherein the weight parameter inputs comprise a plurality of first input weight parameters, the weight parameter outputs comprise a plurality of first output weight parameters, and the parallel processing sub-modules comprise:
        a plurality of parallel sub-memories configured to parallelly store the weight parameter inputs and comprising:
            a plurality of first parallel sub-memories provided, respectively, for parallelly receiving and storing one of the first input weight parameters; and
        a plurality of parallel sub-processors provided, respectively, for being electrically connected to the decoding module and one of the parallel sub-memories and comprising:
            a plurality of first parallel sub-processors provided, respectively, for being electrically connected to one of the first parallel sub-memories to receive one of the first input weight parameters according to the operational command for outputting one of the first output weight parameters,
    wherein each of the first output weight parameters comprises a plurality of 3×3 weight parameters;
    wherein the computing module comprises a 3×3 computing sub-module electrically connected to the first parallel sub-processors and computing for producing a 3×3 post-processing computing data according to the first output weight parameters and the input data, and the 3×3 computing sub-module comprises:
        a plurality of 3×3 convolutional distributor assemblies, wherein each of the 3×3 convolutional distributor assemblies is electrically connected to one of the first parallel sub-processors, so that the 3×3 convolutional distributor assemblies are configured to receive and distribute the 3×3 weight parameters of the first output weight parameters;
        a plurality of 3×3 local convolutional computing units, wherein each of the 3×3 local convolutional computing units is electrically connected to one of the 3×3 convolutional distributor assemblies and comprises:
            a 3×3 local register assembly electrically connected to one of the 3×3 convolutional distributor assemblies, wherein the 3×3 local register assemblies of the 3×3 local convolutional computing units receive and store the 3×3 weight parameters of the first output weight parameters for outputting a plurality of 3×3 computing parameters according to the 3×3 weight parameters of the first output weight parameters; and
            a 3×3 local filtering computing unit electrically connected to the 3×3 local register assembly, wherein the 3×3 local filtering computing units of the 3×3 local convolutional computing units compute for producing a plurality of 3×3 computing data according to the 3×3 computing parameters and the input data; and
        a plurality of 3×3 post-processing computing units electrically connected to the 3×3 local convolutional computing units and performing a 3×3 post-processing computation according to the 3×3 computing data for producing the 3×3 post-processing computing data;
    wherein the output data is the 3×3 post-processing computing data.

2. The convolutional neural network processor of claim 1, wherein the decoding module comprises:
    a program memory configured to store the program input; and
    a command decoder electrically connected to the program memory, wherein the command decoder decodes the program input to output the operational command.

3. The convolutional neural network processor of claim 1, wherein, when the weight parameter inputs have a non-compressed form, the parallel processing sub-modules further comprise:
the parallel sub-memories configured to parallelly store the weight parameter inputs having the non-compressed form; and
the parallel sub-processors, wherein the parallel sub-processors parallelly receive the weight parameter inputs having the non-compressed form according to the operational command to produce the weight parameter outputs.

4. The convolutional neural network processor of claim 1, wherein, when the weight parameter inputs have a compressed form, the parallel processing sub-modules further comprise:
the parallel sub-memories configured to parallelly store the weight parameter inputs having the compressed form; and
the parallel sub-processors, wherein the parallel sub-processors parallelly receive and decompress the weight parameter inputs having the compressed form according to the operational command to produce the weight parameter outputs.

5. The convolutional neural network processor of claim 1, wherein each of the 3×3 local register assemblies comprises:
two sub-3×3 local register assemblies configured to alternately store one of the 3×3 weight parameters or output the 3×3 computing parameter to the 3×3 local filtering computing unit.

6. The convolutional neural network processor of claim 1, wherein the weight parameter inputs further comprise a bias input parameter, the weight parameter outputs further comprise a bias output parameter, the parallel sub-memories further comprise a bias parallel sub-memory configured to parallelly store the bias input parameter, and the parallel sub-processors further comprise a bias parallel sub-processor electrically connected to the bias parallel sub-memory and receiving the bias input parameter according to the operational command for outputting the bias output parameter.

7. The convolutional neural network processor of claim 6, wherein the bias output parameter comprises a plurality of bias parameters,
wherein the computing module further comprises a bias distributor, which is electrically connected to the bias parallel sub-processor and the 3×3 computing sub-module, produces a plurality of 3×3 bias parameters according to the bias output parameter and outputs the 3×3 bias parameters to the 3×3 post-processing computing units.

8. The convolutional neural network processor of claim 1, wherein the weight parameter inputs further comprise at least one second input weight parameter, the weight parameter outputs further comprise at least one second output weight parameter, the parallel sub-memories further comprise at least one second parallel sub-memory configured to parallelly receive and store the at least one second input weight parameter, the parallel sub-processors further comprise at least one second parallel sub-processor electrically connected to the at least one second parallel sub-memory, and the at least one second parallel sub-processor receives the at least one second input weight parameter according to the operational command to output the at least one second output weight parameter.

9. The convolutional neural network processor of claim 8, wherein the computing module comprises:
a 3×3 computing sub-module electrically connected to the first parallel sub-processors and computing for producing a 3×3 post-processing computing data according to the first output weight parameters and the input data; and
a 1×1 computing sub-module electrically connected to the at least one second parallel sub-processor and the 3×3 computing sub-module and computing for producing a 1×1 post-processing computing data according to the at least one second output weight parameter and the 3×3 post-processing computing data;
wherein the output data is the 1×1 post-processing computing data.

10. The convolutional neural network processor of claim 9, wherein the at least one second output weight parameter comprises a plurality of 1×1 weight parameters, and
wherein the 1×1 computing sub-module comprises:
at least one 1×1 convolutional distributor assembly electrically connected to the at least one second parallel sub-processor to receive and distribute the 1×1 weight parameters of the at least one second output weight parameter;
a plurality of 1×1 local convolutional computing units electrically connected to the at least one 1×1 convolutional distributor assembly, wherein each of the 1×1 local convolutional computing units comprises:
a 1×1 local register assembly electrically connected to the at least one 1×1 convolutional distributor assembly, wherein the 1×1 local register assemblies of the 1×1 local convolutional computing units receive and store the 1×1 weight parameters of the at least one second output weight parameter for outputting a plurality of 1×1 computing parameters according to the 1×1 weight parameters of the at least one second output weight parameter; and
a 1×1 local filtering computing unit electrically connected to the 1×1 local register assembly, wherein the 1×1 local filtering computing units of the 1×1 local convolutional computing units compute for producing a plurality of 1×1 computing data according to the 1×1 computing parameters and the 3×3 post-processing computing data; and
a plurality of 1×1 post-processing computing units electrically connected to the 1×1 local convolutional computing units and performing a 1×1 post-processing computation according to the 1×1 computing data for producing the 1×1 post-processing computing data.

11. The convolutional neural network processor of claim 10, wherein each of the 1×1 local register assemblies comprises:
two sub-1×1 local register assemblies configured to alternately store one of the 1×1 weight parameters or output the 1×1 computing parameter to the 1×1 local filtering computing unit.

12. The convolutional neural network processor of claim 10, wherein the weight parameter inputs further comprise a bias input parameter, the weight parameter outputs further comprise a bias output parameter, the parallel sub-memories further comprise a bias parallel sub-memory configured to parallelly store the bias input parameter, and the parallel sub-processors further comprise a bias parallel sub-processor electrically connected to the bias parallel sub-memory and receiving the bias input parameter according to the operational command to output the bias output parameter.

13. The convolutional neural network processor of claim 12, wherein the bias output parameter comprises a plurality of bias parameters;
wherein the computing module further comprises:
a bias distributor electrically connected to the bias parallel sub-processor, the 3×3 computing sub-module and the 1×1 computing sub-module and producing a plurality of 3×3 bias parameters and a plurality of 1×1 bias parameters according to the bias output parameter;
wherein the bias distributor outputs the 3×3 bias parameters to the 3×3 post-processing computing units, and
wherein the bias distributor outputs the 1×1 bias parameters to the 1×1 post-processing computing units.

14. A data processing method of a convolutional neural network processor, comprising:
performing a receiving step to drive an information decode unit to receive a program input and a plurality of weight parameter inputs, wherein the information decode unit comprises a decoding module and a parallel processing module;
performing a command decoding step to drive the decoding module to receive the program input and output an operational command according to the program input;
performing a parallel processing step to drive the parallel processing module to receive the weight parameter inputs and parallelly process the weight parameter inputs according to the operational command for producing a plurality of weight parameter outputs; and
performing a computing step to drive a computing module to receive an input data and the weight parameter outputs and compute the input data and the weight parameter outputs according to the operational command for producing an output data,
wherein the weight parameter outputs comprise a plurality of first output weight parameters, the computing module comprises a 3×3 computing sub-module, and the computing step comprises:
performing a first computing sub-step to drive the 3×3 computing sub-module to receive the input data and the first output weight parameters for producing a 3×3 post-processing computing data,
wherein each of the first output weight parameters comprises a plurality of 3×3 weight parameters;
wherein the 3×3 computing sub-module comprises a plurality of 3×3 convolutional distributor assemblies, a plurality of 3×3 local convolutional computing units and a plurality of 3×3 post-processing computing units; and
wherein the first computing sub-step comprises:
performing a 3×3 parameter distribution procedure for driving the 3×3 convolutional distributor assemblies to receive the 3×3 weight parameters of the first output weight parameters and distribute the 3×3 weight parameters of the first output weight parameters to the 3×3 local convolutional computing units, wherein each of the 3×3 local convolutional computing units comprises a 3×3 local register assembly and a 3×3 local filtering computing unit;
performing a 3×3 computing parameter production procedure for driving the 3×3 local register assemblies of the 3×3 local convolutional computing units to receive the 3×3 weight parameters of the first output weight parameters and produce a plurality of 3×3 computing parameters according to the 3×3 weight parameters of the first output weight parameters;
performing a 3×3 convolutional computing procedure for driving the 3×3 local filtering computing units of the 3×3 local convolutional computing units to perform a 3×3 convolutional computation to the 3×3 computing parameters and the input data for producing a plurality of 3×3 computing data; and
performing a 3×3 post-processing computing procedure for driving the 3×3 post-processing computing units to perform a 3×3 post-processing computation to the 3×3 computing data for producing the 3×3 post-processing computing data, wherein the output data is the 3×3 post-processing computing data.

15. The data processing method of claim 14, wherein the decoding module comprises a program memory and a command decoder, and the command decoding step comprises:
performing a program storing sub-step to drive the program memory to store the program input; and
performing a program decoding sub-step to drive the command decoder to decode the program input so as to produce the operational command.

16. The data processing method of claim 14, wherein the parallel processing module comprises a plurality of parallel sub-memories and a plurality of parallel sub-processors, and the parallel processing step comprises:
performing a weight parameter storing sub-step to drive the parallel sub-memories to parallelly store the weight parameter inputs; and
performing a weight parameter processing sub-step to drive the parallel sub-processors to parallelly read the weight parameter inputs and perform an operation according to the operational command for producing the weight parameter outputs.

17. The data processing method of claim 16, wherein,
when the weight parameter inputs have a non-compressed form, the operation is performed to store the weight parameter inputs having the non-compressed form; and
when the weight parameter inputs have a compressed form, the operation is performed to store and decompress the weight parameter inputs having the compressed form.

18. The data processing method of claim 14, wherein the weight parameter outputs further comprise a bias output parameter, the computing module further comprises a bias distributor, and the computing step further comprises:
performing a bias computing sub-step to drive the bias distributor to produce a plurality of 3×3 bias parameters according to the bias output parameter and provide the 3×3 bias parameters to the 3×3 computing sub-module.

19. The data processing method of claim 14, wherein the weight parameter outputs further comprise at least one second output weight parameter, the computing module further comprises a 1×1 computing sub-module, and the computing step further comprises:
performing a second computing sub-step to drive the 1×1 computing sub-module to receive the 3×3 post-processing computing data and the at least one second output weight parameter so as to produce a 1×1 post-processing computing data.

20. The data processing method of claim 19, wherein the least one second output weight parameter comprises a plurality of 1×1 weight parameters;
wherein the 1×1 computing sub-module comprises a plurality of 1×1 convolutional distributor assemblies, a plurality of 1×1 local convolutional computing units and a plurality of 1×1 post-processing computing units; and wherein the second computing sub-step comprises:

performing a 1×1 parameter distribution procedure for driving at least one of the 1×1 convolutional distributor assemblies to receive the 1×1 weight parameters of the at least one second output weight parameter and distribute the 1×1 weight parameters of the at least one second output weight parameter to the 1×1 local convolutional computing units, wherein each of the 1×1 local convolutional computing units comprises a 1×1 local register assembly and a 1×1 local filtering computing unit;

performing a 1×1 computing parameter production procedure for driving the 1×1 local register assemblies of the 1×1 local convolutional computing units to receive the 1×1 weight parameters of the at least one second output weight parameter and produce a plurality of 1×1 computing parameters according to the 1×1 weight parameters of the at least one second output weight parameter;

performing a 1×1 convolutional computing procedure for driving the 1×1 local filtering computing units of the 1×1 local convolutional computing units to perform a 1×1 convolutional computation to the 1×1 computing parameters and the 3×3 post-processing computing data for producing a plurality of 1×1 computing data; and performing a 1×1 post-processing computing procedure for driving the 1×1 post-processing computing units to perform a 1×1 post-processing computation to the 1×1 computing data for producing the 1×1 post-processing computing data, wherein the output data is the 1×1 post-processing computing data.

21. The data processing method of claim 19, wherein the output weight parameters further comprise a bias output parameter, the computing module further comprises a bias distributor, and the computing step further comprises:

performing a bias computing sub-step to drive the bias distributor to produce a plurality of 3×3 bias parameters and a plurality of 1×1 bias parameters according to the bias output parameter, wherein the bias distributor provides the 3×3 bias parameters to the 3×3 computing sub-module, and the bias distributor provides the 1×1 bias parameters to the 1×1 computing sub-module.

* * * * *